United States Patent
Esposito, II et al.

(10) Patent No.: US 10,754,847 B2
(45) Date of Patent: Aug. 25, 2020

(54) METHOD, APPARATUS AND SYSTEM FOR PRODUCTION MANAGEMENT

(71) Applicant: CANNAGRI BLOCKCHAIN, INC., Toronto (CA)

(72) Inventors: Patrick R. Esposito, II, Morgantown, WV (US); Matthew J. Milan, Toronto (CA); Jon H.C. Tirmandi, Toronto (CA); Mark T. Wise, Morgantown, WV (US); Zenovy S. Wowczuk, Morgantown, WV (US)

(73) Assignee: CANNAGRI BLOCKCHAIN, INC., Toronto (CA)

( * ) Notice: Subject to any disclaimer, the term of this patent is extended or adjusted under 35 U.S.C. 154(b) by 169 days.

(21) Appl. No.: 16/012,438

(22) Filed: Jun. 19, 2018

(65) Prior Publication Data

US 2019/0384839 A1     Dec. 19, 2019

(51) Int. Cl.
  *G06F 16/23*     (2019.01)
(52) U.S. Cl.
  CPC ...... *G06F 16/2365* (2019.01); *G06F 16/2379* (2019.01)
(58) Field of Classification Search
  CPC .. G06F 16/951; G06F 16/182; G06F 16/1834; G06F 16/1824; G06F 16/1837; G06F 16/2365; G06F 16/2379; G06F 16/27; G06F 16/9024; G06F 16/23
  USPC ................................................. 707/687, 690
  See application file for complete search history.

(56) References Cited

U.S. PATENT DOCUMENTS

| | | | |
|---|---|---|---|
| 9,608,829 B2 | 3/2017 | Spanos et al. | |
| 2016/0259937 A1 | 9/2016 | Ford et al. | |
| 2017/0031676 A1 | 2/2017 | Cecchetti et al. | |
| 2017/0279774 A1 | 9/2017 | Booz et al. | |
| 2017/0302663 A1 | 10/2017 | Nainar et al. | |
| 2017/0364552 A1 | 12/2017 | Pattanaik et al. | |
| 2018/0005186 A1* | 1/2018 | Hunn | G06F 40/103 |
| 2018/0302215 A1* | 10/2018 | Salgueiro | H04L 9/3239 |
| 2019/0303541 A1* | 10/2019 | Reddy | H04L 9/0643 |

(Continued)

FOREIGN PATENT DOCUMENTS

| | | |
|---|---|---|
| WO | 2017/187397 A1 | 11/2017 |
| WO | 2017/0218984 A1 | 12/2017 |

OTHER PUBLICATIONS

International Search Report and Written Opinion of the International Searching Authority, dated Aug. 29, 2019 for PCT/US2019/0036882.

(Continued)

*Primary Examiner* — James Trujillo
*Assistant Examiner* — Fariborz Khoshnoodi
(74) *Attorney, Agent, or Firm* — Kramer Amado, P.C.

(57) ABSTRACT

Various embodiments relate to a method and apparatus automated production management, the system including a storage device configured to store data and program instructions; and a processor configured to receive data from a production asset and process the data, detect an event from the data, add a record to an edge blockchain, determine whether an action is required based on the event, communicate the action to the production asset, add a record to the edge blockchain and transmit edge blockchain to an enterprise information system to be stored in a core blockchain.

16 Claims, 8 Drawing Sheets

(56) References Cited

U.S. PATENT DOCUMENTS

2019/0319792 A1* 10/2019 Irwan .................... H04L 9/3093
2019/0373472 A1* 12/2019 Smith .................... H04L 63/00

OTHER PUBLICATIONS

Geschreven, https://www.centric.eu/NL/Default/Themas/Blogs/2018/02/13/Blockchain, Feb. 13, 2018.
Stanciu, "Blockchain Based Distributed Control System for Edge Computing", https://ieeexploreieee.org/document/7968630/.
Xiong, et al., "Edge Computing Resource Management and Pricing for Mobile Blockchain", arXiv:1710.01567v1 [cs.CR] Oct. 4, 2017.
Xiong, et al., "When Mobile ABlockchain Meets Edge Computing", arXiv:1711.05938v2 [cs.DC] Apr. 11, 2018.
Zhu, et al., "EdgeChain: Blockchain-based Multi-vendor Mobile Edge Application Placement", arXlv:1801.04035v1 [cs.NI] Jan. 12, 2018.

* cited by examiner

METHOD, APPARATUS AND SYSTEM FOR PRODUCTION MANAGEMENT

TECHNICAL FIELD

This disclosure relates generally to optimization of production management activities, and more specifically, but not exclusively, to data collection and automation of production management in farming, agricultural and manufacturing areas.

BACKGROUND

Farm production, agricultural production, manufacturing production, and other production activities that rely on sensors, Internet of Things (IoT) devices, and enterprise information systems require data integrity and trust. When the agricultural or manufacturing products are later evaluated, understanding the conditions at the time of growth/manufacture may give insights into the status and condition of the products, and the integrity of that data may be important, for example, when safety issues arise.

SUMMARY

A brief summary of various example embodiments is presented. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

Various embodiments relate to an edge node in a system for automated production management, the system including a storage device configured to store data and program instructions; and a processor configured to receive data from a production asset and process the data, detect an event from the data, add a record including the event to an edge blockchain, determine whether an action is required based on the event, communicate the action to the production asset, add a record including the action to the edge blockchain and transmit edge blockchain to an enterprise information system to be stored in a core blockchain.

In an embodiment of the present disclosure, the processor is further configured to queue the data for deletion and delete the data when an event from the data is not detected and queue the event for deletion and delete the event when an action based on the event is not required.

In an embodiment of the present disclosure, the processor is further configured to detect an event from the data by identifying a source of the data, matching the source of the data to be from an accepted source and matching the data to standard parameters for the data and determining that the data is outside the range of the standard parameters.

In an embodiment of the present disclosure, the processor is further configured to measure the edge node memory and storage capacity, determine whether an acceptable amount of remaining memory and storage capacity exists in the edge node and continue participation in edge blockchain.

In an embodiment of the present disclosure, the processor is further configured to determine whether an unacceptable amount of remaining memory and storage capacity exists in the edge node, confirm edge blockchain record proliferation has occurred, terminate participation in the edge blockchain, refresh the edge node, re-engage the edge node in the edge blockchain and continue participation in the edge blockchain.

In an embodiment of the present disclosure, the processor is further configured to confirm blockchain record proliferation has not occurred, continue participation in the edge blockchain and send an edge node capacity alert to the end-user system device.

In an embodiment of the present disclosure, the processor is further configured to refuse the data for processing when an unacceptable amount of remaining memory and storage capacity exists in the edge node.

In an embodiment of the present disclosure, the processor is further configured to confirm the data, record the data to the storage device and validate the data.

In an embodiment of the present disclosure, the production asset is a sensor, production equipment or enterprise information system.

Various embodiments relate to an edge node, the edge node being configured to perform steps including receiving data from a production asset and process the data, detecting an event from the data, adding a record to the edge blockchain, determining whether an action is required based on the event, communicating the action to the production asset, adding a record to the edge blockchain and transmitting edge blockchain to an enterprise information system to be stored in a core blockchain.

In an embodiment of the present disclosure, the edge node configured to perform steps further including queuing the data for deletion and delete the data when an event from the data is not detected and queuing the event for deletion and delete the event when an action based on the event is not required.

In an embodiment of the present disclosure, the edge node configured to perform steps further including detecting an event from the data based on an instruction set by identifying a source of the data, matching the source of the data to be from an accepted source and matching the data to standard parameters for the data and determining that the data is outside the range of the standard parameters.

In an embodiment of the present disclosure, the edge node configured to perform steps further including measuring the edge node memory and storage capacity, determining whether an acceptable amount of remaining memory and storage capacity exists in the edge node and continuing participation in edge blockchain.

In an embodiment of the present disclosure, the edge node configured to perform steps further including determining whether an unacceptable amount of remaining memory and storage capacity exists in the edge node, confirming edge blockchain record proliferation has occurred, terminating participation in the edge blockchain, refreshing the edge node, re-engaging the edge node in the edge blockchain and continuing participation in the edge blockchain.

In an embodiment of the present disclosure, the edge node configured for performing the steps further including confirming blockchain record proliferation has not occurred, continuing participation in the edge blockchain and sending an edge node capacity alert to the end-user system device.

In an embodiment of the present disclosure, the edge node configured for performing the steps further including refusing the data for processing when an unacceptable amount of remaining memory and storage capacity exists in the edge node.

In an embodiment of the present disclosure, the edge node configured for performing the steps further including adding the record to the edge blockchain confirming the record, recording the record to the storage device and validating the record.

In an embodiment of the present disclosure, the production asset is a sensor, production equipment or enterprise information system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims, and explain various principles and advantages of those embodiments.

These and other more detailed and specific features are more fully disclosed in the following specification, reference being had to the accompanying drawings, in which.

DETAILED DESCRIPTION

Figure 1:
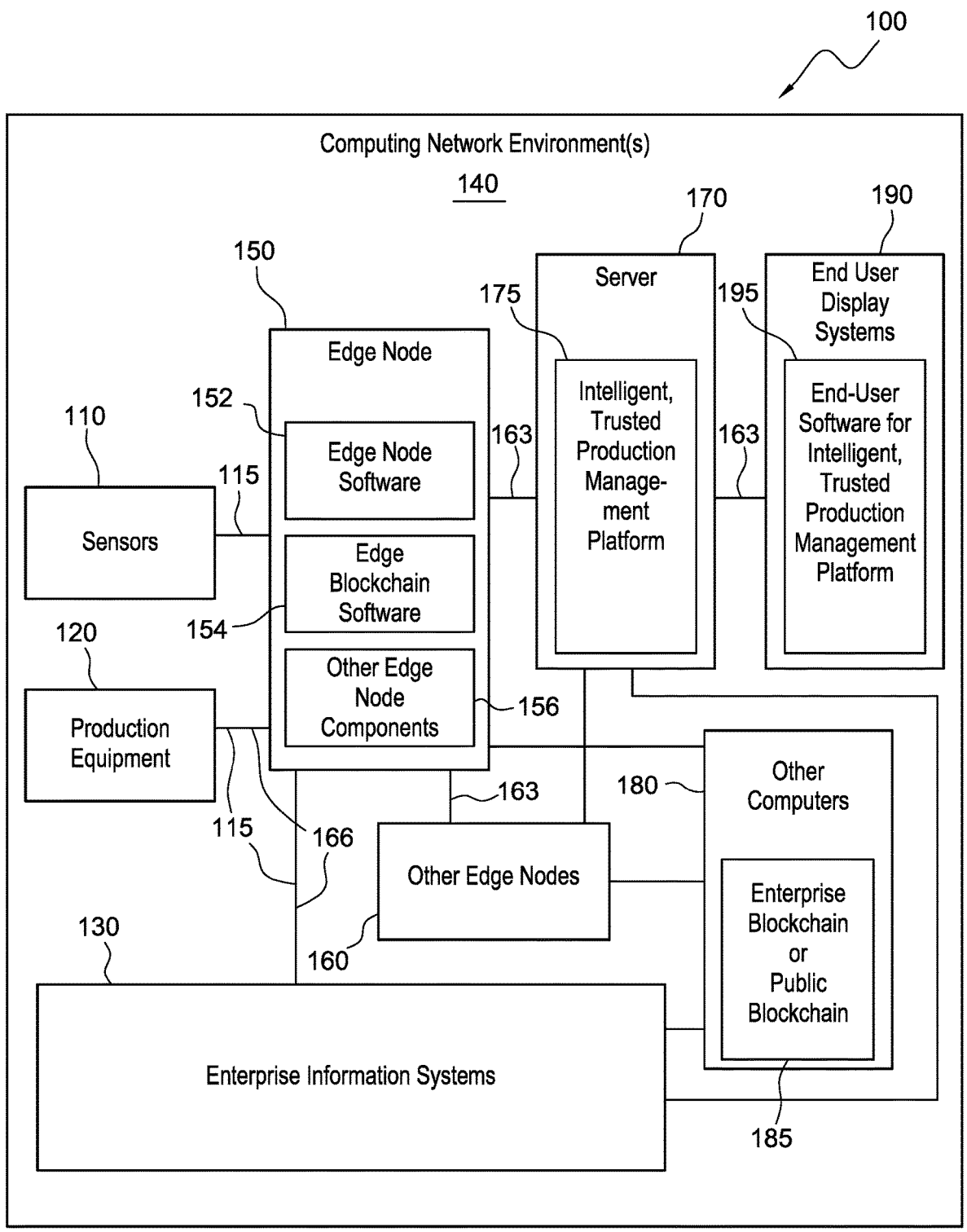
FIG. 1 illustrates a block diagram of the production management system of the current embodiment.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

Reference will now be made to embodiments of apparatuses, systems, and methods for intelligent, trusted production management, examples of which are illustrated in the accompanying drawings. Details, features, and advantages of those apparatuses, systems and methods for intelligent, trusted production management will become further apparent in the following detailed description of embodiments thereof. It is to be understood that the figures and descriptions included herein illustrate and describe elements that are of particular relevance to apparatuses, systems, and methods for intelligent, trusted production management, while eliminating, for purposes of clarity, other elements found in typical production management systems.

Any reference in the specification to "one embodiment," "a certain embodiment," or any other reference to an embodiment is intended to indicate that a particular feature, structure, or characteristics described in connection with the embodiment is included in at least one embodiment and may be utilized in other embodiments as well. Moreover, the appearances of such terms in various places in the specification are not necessarily all referring to the same embodiment.

Precision agriculture and robotic manufacturing provide advanced monitoring, management, production and control systems that become more reliable and trusted by locating trusted computing capabilities at the edge of the network, near sensors and IoT devices.

Precision agriculture focuses on making farming and agricultural activities more accurate and controlled for growing crops, raising livestock, and processing cultivated or grown products. By using technologies such as GPS guidance, control systems, sensors, robotics, drones, autonomous vehicles, variable rate technology, GPS-based soil sampling, automated hardware, telematics, and software, precision agriculture has made these activities more accurate and controlled.

Similarly, robotics manufacturing focuses on creating manufacturing and production efficiencies from raw material handling to finished product packing and by utilizing technologies such as control systems, sensors, robotics, automated hardware, and software, robotics manufacturing has become more accurate and controlled.

In precision agriculture and robotic manufacturing, current advanced monitoring, management, production and control systems fail to perform due to high costs and performance shortfalls. In addition to these deficiencies, risks in using these systems include a risk to data integrity which undermines the premise of reliable, intelligent automation, and long-term intelligent analytics.

Blockchain and other distributed ledger technologies, which are inherently resistant to modification to data, allow for an increase in the trust of data in production environments, however, blockchain and other distributed ledger technologies have been difficult to implement in production environments due to the high computational requirements of data processing systems required for participation in a blockchain based, peer-to-peer data network that adheres to a protocol for inter-node communication and majority validation model, which creates an immutable record.

There is a need for a system, apparatus and methods for conducting intelligent, trusted production management activities in farming, agricultural, and manufacturing production environments with trusted data collection and computer-based automated production management decisions.

FIG. 1 illustrates a block diagram of the production management system 100 of the current embodiment.

The production management system 100 includes sensors 110, production equipment 120, enterprise information systems 130, an edge node 150 including edge node software 152, edge blockchain software 154 and other edge node components 156, other edge nodes 160, a server 170 including a production management platform 175, other computers 180 including an enterprise blockchain or public blockchain 185 and end-user display systems 190 including end-user display software for the production management platform 195.

The production management system 100 is configured for identification of events 166 from the instructions in the edge node software 152 and instructions in the production management platform 175 based upon the data 115 from the sensors 110, production equipment 120, and enterprise information systems 130. The production management system 100 is further configured for effectuating of actions 166 based upon instructions in the edge node software 152 and instructions in the production management platform 175, and user interaction with the end-user display software 195. The information may be transmitted using Internet Protocol ("IP") or non-IP data transmission protocols over wired, optical, or wireless channels. Where the data is non-IP, it may be converted to IP for utilization.

The sensors 110 (for example, hyperspectral cameras, temperature sensors, weight measurement sensors, air quality sensors, or other sensors) and the production equipment 120, may be located within the production management system 100, transmits data 115 based on the specific characteristics of the sensors 110 and production equipment 120 and when a production management system 100 supports connectivity to an edge node 150 or other edge nodes 160, those nodes will receive the data 115.

The edge node 150 or other edge nodes 160 include instructions and communication interfaces for receiving data 115 from sensors 110, the production equipment 120, or the enterprise information systems 130. The term production assets may be used to define sensors 110, production equipment 120 or enterprise information systems 130.

Based upon these instructions the edge node may process the data 115 and detect an event 166 of significance to a given production process.

The edge node may then record the event 163, on a trusted basis, to the edge node software 152, edge blockchain software 154, the production management platform 175, and the enterprise blockchain software or public blockchain software 185.

The edge node may then execute instructions based upon the event 163, as an action 166, which may be communicated to the production equipment 120 and the enterprise information systems 130.

The edge node may then confirm the execution of the instructions as an action 166, as an event 163, which may be communicated to the production equipment 120 and the enterprise information systems 130, if required based upon the instructions.

The edge node may then access a local data storage capacity.

The edge node may then manage local data storage capacity between and among the edge node 150 and other edge nodes 160 being utilized as a local network of shared storage and processing assets to execute instructions from the edge nodes for load balancing and optimized data storage.

The edge node may then deliver event and activity information to the end-user display systems. Further detailed operation of the production management system 100 will be provided below.

Figure 2:
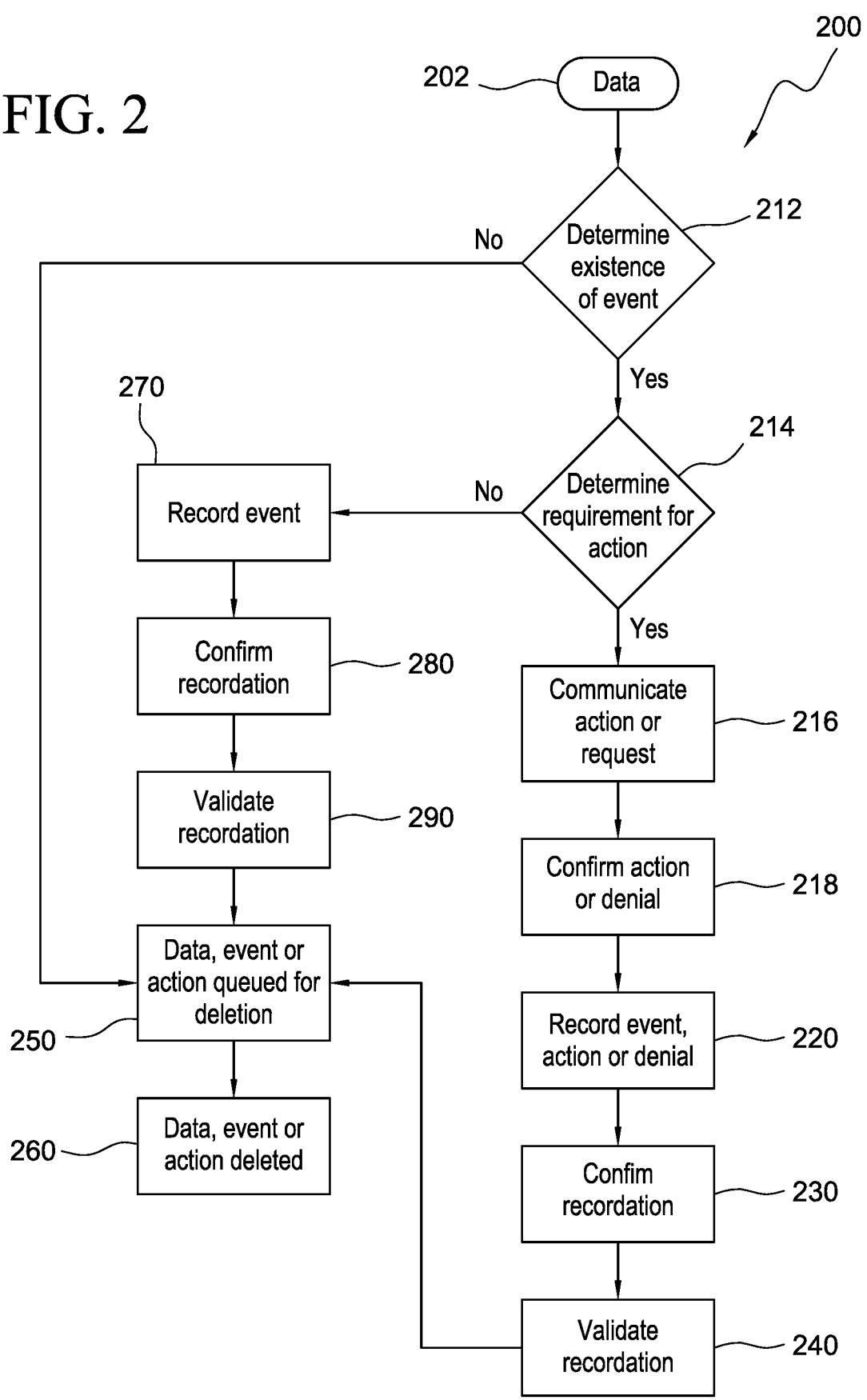
FIG. 2 illustrates a flow chart of the process for the production management system for the edge node of the current embodiment.

FIG. 2 illustrates a flow chart of the operation the edge node 200 of the current embodiment.

The process 200 begins at step 202 where data from the sensors, the production equipment, or the enterprise information systems is transmitted to an edge node. Sensors, production equipment or enterprise information systems may be referred to as production assets.

The process 200 then proceeds to step 212 where the edge node, using the instruction set, which may be implemented as software in the edge node, determines the existence of an event. For example, an event for a temperature sensor may be an increase in the temperature outside of the acceptable range. Another example of an event for a hyperspectral camera may be readings with the hyperspectral camera outside of an acceptable range.

If no event exists, the process 200 proceeds to step 250 where the data is queued for deletion 250 and then the process 200 proceeds to step 260 where the data, event or action is deleted 260.

If an event exists, the process 200 proceeds to step 214 to determine whether there is a requirement for action.

If no action is required, the process 200 proceeds to step 270 which records the event then the process 200 proceeds to step 280 which confirms the recordation then the process 200 proceeds to step 290 which validates the recordation then the process 200 proceeds to step 250 where the data is queued for deletion 250 and then the process 200 proceeds to step 260 where the data, event or action is deleted.

If an action is required, the process 200 proceeds to step 216 which communicates the action or request to the appropriate recipient. The action would be implemented, on an automated basis, by production equipment or enterprise information systems. The request for action, on a non-fully automated basis, would be transmitted to production equipment or enterprise information systems or a user of the end-user system. In the instance of a temperature-related event, such a requirement for action could be the determination of a message to be sent to the building management system to adjust the climate conditions. When multiple events are determined, the edge node may increase or decrease actions in other production systems.

The process 200 may then proceed to step 218 to confirm the action or deny the action. Once step 218 is completed, the process 200 proceeds to step 220 where a record of the action or denial is created on the same edge node and then the process 200 proceeds to step 230 which is a confirmation of the action or denial and then the process 200 proceeds to step 240 which is a validation of the recordation then the process proceeds to step 250 where the data is queued for deletion and then the process 200 proceeds to step 260 where the data, event or action is deleted.

Figure 3:
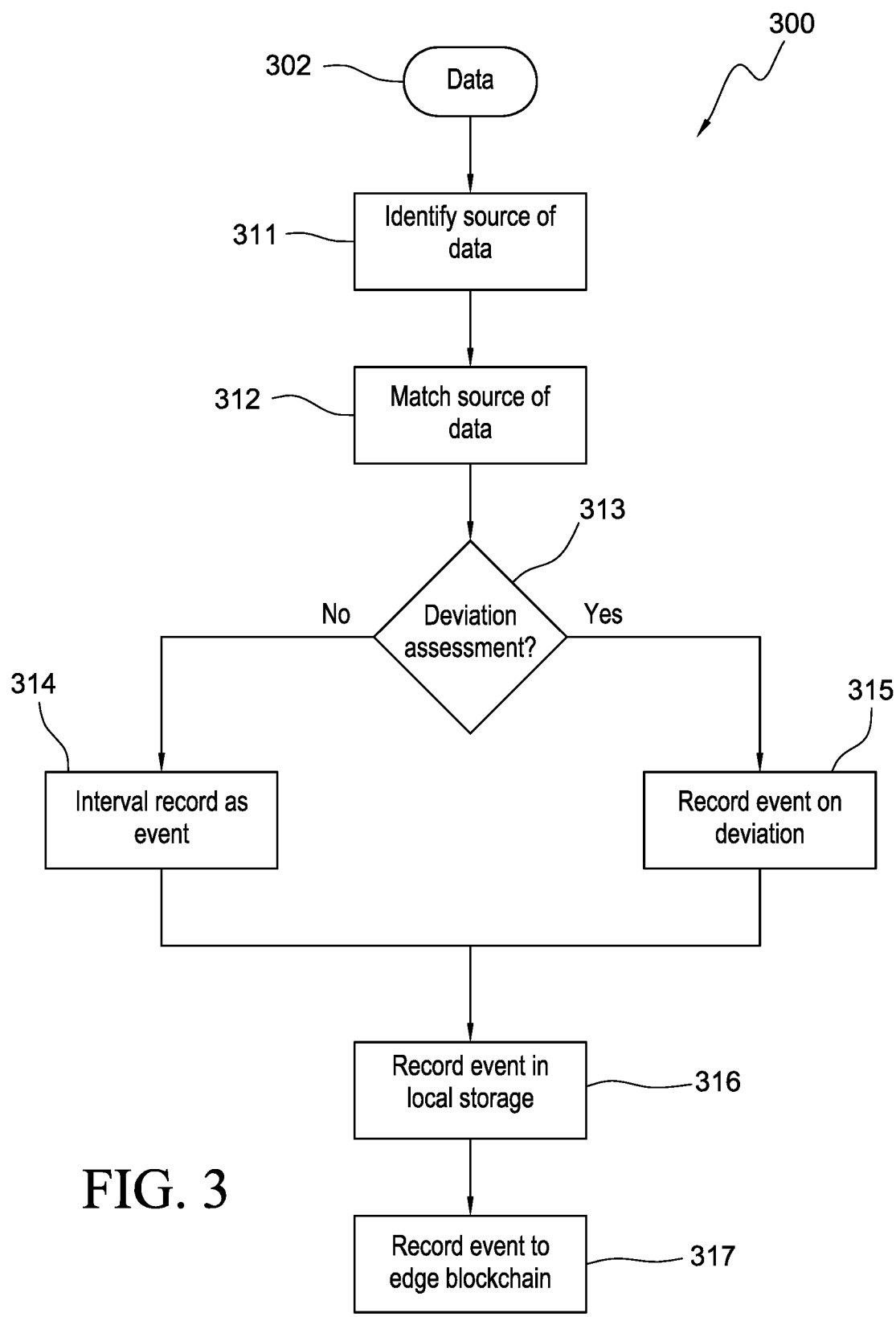
FIG. 3 illustrates a flow chart for the process of detecting an event significant to the production management system of the current embodiment.

FIG. 3 illustrates a flow chart for the process of detecting an event significant to the production management system 100 of the current embodiment.

The process 300 begins at step 302, which is an expansion of step 212 in FIG. 2, where data from the sensors, the production equipment, or the enterprise information systems is transmitted to an edge node. The instructions set may be integrated as software into the edge node which are executed.

The process 300 then may proceed to step 311 where the edge node identifies the source of data, which is required for the deviation assessment at step 313

The process 300 then may proceed to step 312 where the edge node matches the source of data to be from an accepted source, for example, a known source on the edge network and comparing the data to standard parameters values for the data based upon the source.

The process 300 then may proceed to step 313 to conduct a deviation assessment. If there is no deviation, then at the process 300 proceeds to step 314 where when no deviation is found, no event has occurred subject to the potential for an interval event. In addition, at step 313, when periodic sampling of data at step 302 is called for, the interval record as an event 314 would be recorded to local storage within the edge node at step 316 and to the edge blockchain at step 317.

The process then proceeds to step 316 where the event is recorded to a local storage within the edge node and then the process proceeds to step 317 where the event is recorded to the edge blockchain.

If there is a deviation, the process 300 proceeds to step 315 where the deviation is recorded as an event.

The process 300 then proceeds to step 316 where the event is recorded to a local storage within the edge node and then the process proceeds to step 317 where the event is recorded to the edge blockchain.

Figure 4:
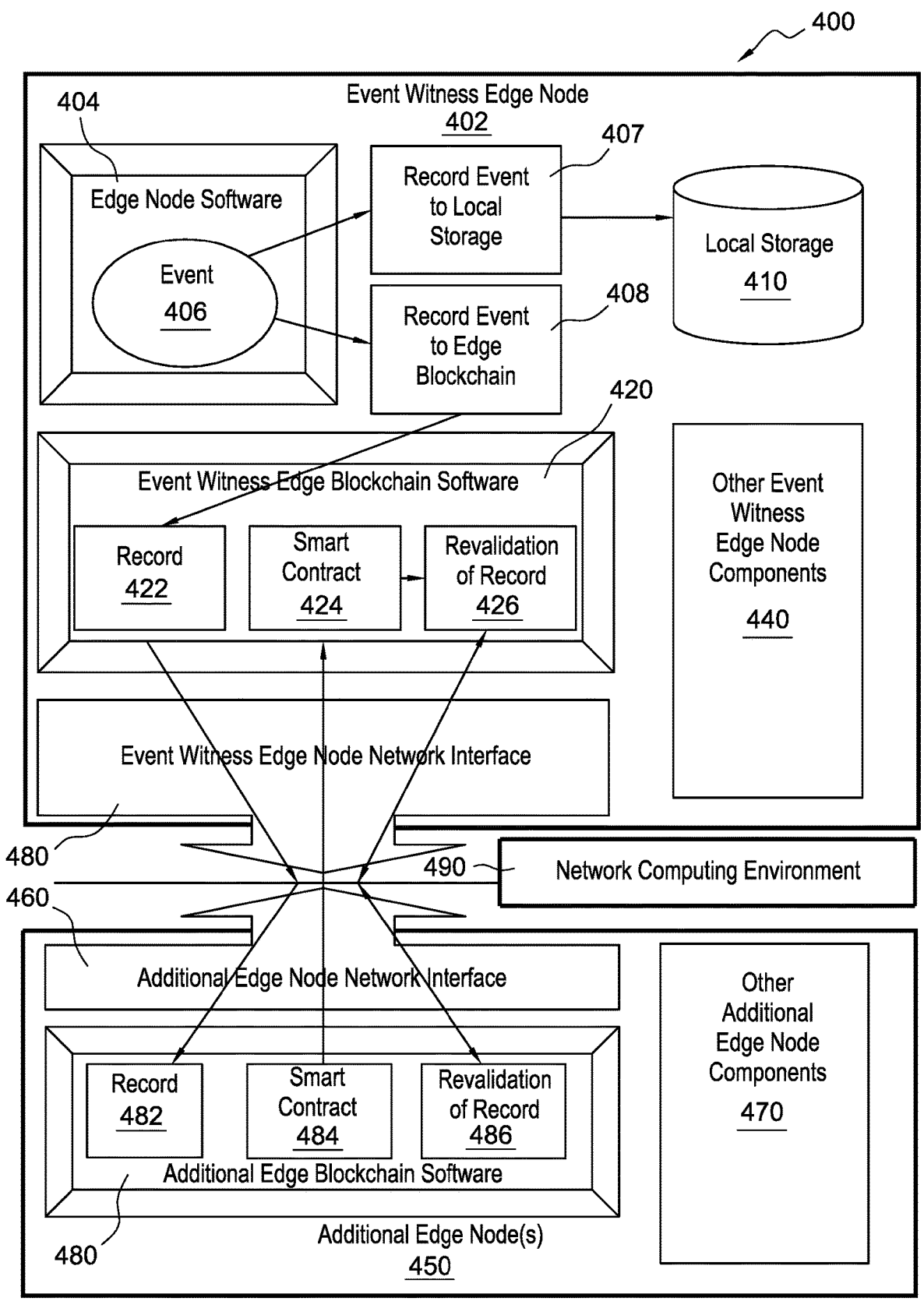
FIG. 4 illustrates a block diagram of an edge network of multiple edge nodes being utilized as a network of shared storage and processing for use in the production management system of the current embodiment.

FIG. 4 illustrates a block diagram of an edge network 400 including multiple edge nodes being utilized as a network of shared storage and processing for use in the production management system of the current embodiment.

The edge network 400 relies on edge computing devices to support edge node software 404 and edge blockchain software 420 and the edge node network interface 480 that use measurements, events and actions from physical world devices, including sensors, production equipment and enterprise information systems as the basis for production management and trusted digital activities, including blockchain mining transactions, future blockchain transaction validation and related distributed ledger and trusted computing activities.

Through the edge blockchain software 420 and 480, the edge network 400 shifts blockchain mining to distributed edge computing systems and increases the speed of any transaction validation, as the number of nodes on the blockchain or other distributed ledger has been increased, latency decreased, and additional centralized computing infrastructure costs avoided, and this increases data integrity and trust to optimize production.

The edge network 400 may include a primary edge node 402, as an event witness edge node that may detect events and register the event 406 by recording the event 407 to a local storage 410 that may also include edge blockchain software 420, a network interface 480 and other edge node components 440 within the edge node.

The edge node software 404 may also record the event 408 to the edge blockchain software 420 and through the creation of the record 422, the first necessary activity for the creation of an edge blockchain has occurred.

The edge network 400 may include a network computing environment 490 and additional edge nodes 450. Similar to the edge node 402, the additional edge nodes may include edge blockchain software 480, a network interface 460 and other edge node components.

The edge network 400 may include an array of distributed edge computing assets, either heterogeneous or homogenous in nature, to support transfer of functions and load balancing between the edge computing assets related to the core monitoring, management, production and control functions, as well as the critical storage, blockchain mining, and blockchain validation activities which are linked to centralized storage and a core blockchain.

The record 422 may be based upon the instruction set from edge node software 404 which may create support for the establishment of the immutable record creation necessary for the blockchain mining and resulting hashing. The interaction of the record creation may be the trigger for a transfer of the record 422 to another edge node 450 with another instance of the edge blockchain software 480 to support a copy of the record 482 which would provide a payment for the transfer of the record in the form of a payment with opening of storage capacity within the edge node. These two actions would form the smart contract 424 and 484 required for the blockchain hash and future record validation by 426 and 486, which is necessary to support trust in the production management system.

These edge blockchains would exist within the support management of all communications for the production management environments and serve as the managers of the private edge blockchains and support data storage, resource management, and load balancing decisions as well as serve as the trusted channels for multi-party validation of transaction records and to ensure the security of data exchanged between the edge blockchains and the core blockchain.

These edge node networks 400 monitor, filter and report any attempts by non-trusted devices to augment the transaction records, any device to transmit non-standard data, and, if validation of trust or transaction records fails, block the non-trusted device or non-validated data from leaving the distributed edge computing environment.

Figure 5:
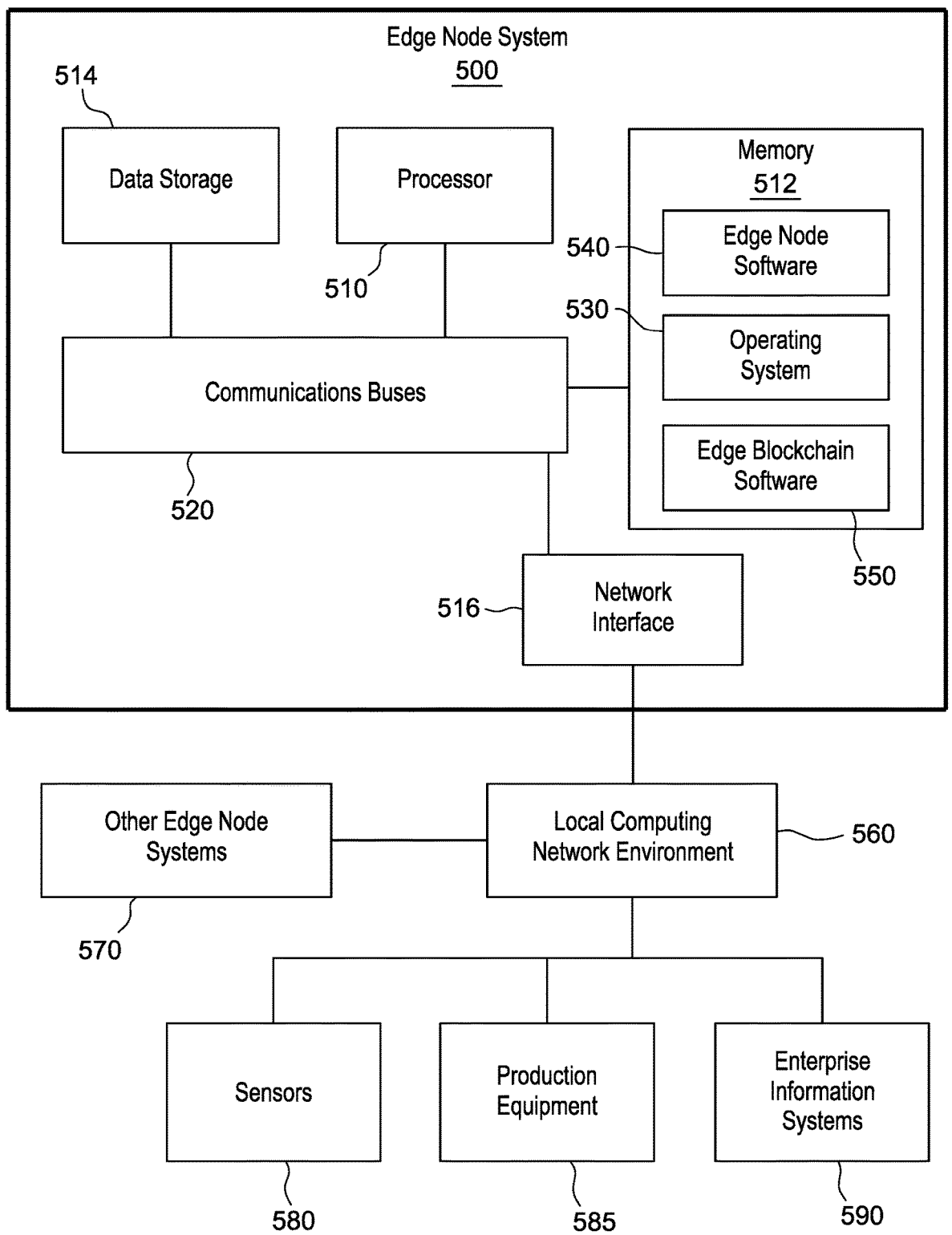
FIG. 5 illustrates a block diagram of edge node system for use in the production management system of the current embodiment.

FIG. 5 illustrates a block diagram of edge node system 500 for use in the production management system of the current embodiment.

Each edge node system 500 includes a processor or microprocessor 510, memory 512, data storage 514 and a network interface 516. Communication between the processor 510, memory 512, storage 514 and the network interface 516 may be through communication buses 520.

The network interface 516 may support connectivity to a local computing network environment 560. The local computing network environment 560 may further support connectivity by an edge node system 500 to other edge node systems 570, sensors 580, production equipment, and enterprise information systems 590 to implement the production management systems.

The edge node system 500 may include a memory 512 which includes an operating system 530, edge node software 540, edge blockchain software 550, and may have stored various other software applications.

The edge node software 540 may support the data, events, actions or requests for action to be taken within the production management system 100.

The edge node system 500 may have fewer or greater number of components than illustrated in FIG. 5. Moreover, the storage device 514 may not be necessary for operation of the edge node system 500 as data may be stored in memory, for example. Data may also be stored remotely and accessed over a network.

The processor 510 may execute the program instructions and process the data stored in the memory 512. The instructions may be stored in memory 512 in a compressed or encrypted format.

Executing the instructions by a processor encompasses instructions stored in a compressed or encrypted format and instructions that may be compiled or installed by an installer before being executed by the processor 510.

The network interface 516 permits communication between the edge node system 500 and other components of the production management system 100.

Figure 6:
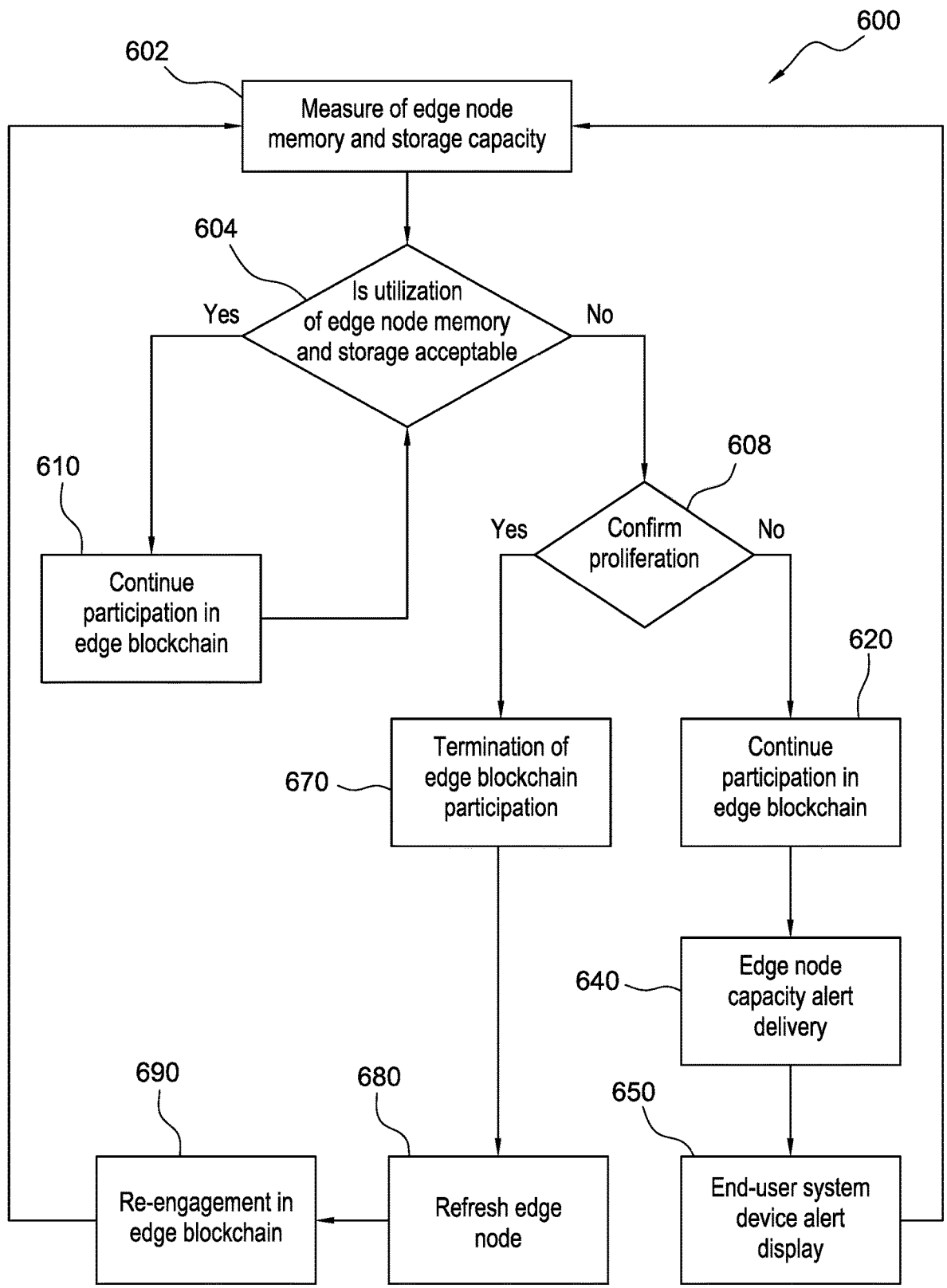
FIG. 6 illustrates a flow chart for the process of managing data storage and memory capacity of edge nodes in the production management system of the current embodiment.

FIG. 6 illustrates a flow chart for the process of managing data storage and memory capacity of edge nodes in the production management system 600 of the current embodiment.

Edge nodes may be utilized in an edge network of shared storage and processing assets to execute for optimized data storage through the edge node software. The edge network would provide an inherently scalable component of the enterprise cloud computing infrastructure for storage and blockchain-based record validation.

The edge blockchain does not, without the instructions from the edge node software have the capacity to support the permanence required of blockchains.

The process 600 begins at step 602 where measure of edge node memory and storage capacity is conducted.

The process 600 proceeds to step 604 to determine whether utilization of edge node memory and storage is acceptable. If yes, the process 600 proceeds to step 610 where the edge node continues participation in the edge blockchain.

If no, the process 600 proceeds to step 608 to confirm proliferation, that is determine that records in the edge blockchain have been securely recorded in the enterprise blockchain or the public blockchain. If yes, the process 600 proceeds to step 670 if there is a confirmation of blockchain record proliferation to the edge blockchain and core blockchain, then the edge node, through the edge node software, at step 670 terminates participation in the edge blockchain and the edge node at step 680 refreshes the edge blockchain by elimination of stored blockchain records.

When the core blockchain receives the proliferated edge blockchain to incorporate into the core blockchain, the individual records may be pulled from the edge blockchain and each added to the core blockchain, or the whole edge blockchain may be stored as a record in the core blockchain.

If no, the process 600 proceeds to step 620 where the edge node continues participation in the edge blockchain then to step 640 where an edge node capacity alert delivery is sent to the end-user system device and step 650 where a device alert is displayed and then to step 602 which measure the edge node memory and storage capacity.

The process 600 then proceeds to step 690 where the edge node reengages in the edge blockchain and the process 600 proceeds back to step 602 measure edge node memory and storage capacity.

These edge blockchains may be instructed by the edge node software to exist for finite periods of time and refresh to become transaction-less and record-less except for the retained equity granted by the edge nodes for continued participation in the edge blockchains, which would provide the basis of support for the future transactions. The finite period may be controlled by the edge nodes to ensure that sufficient transfer of transaction records and other stored assets has occurred and has been confirmed a number of times through the edge blockchain and the core blockchain based upon connectivity and other factors, to the core blockchain over multiple long-term core blockchain assets.

Figure 7:
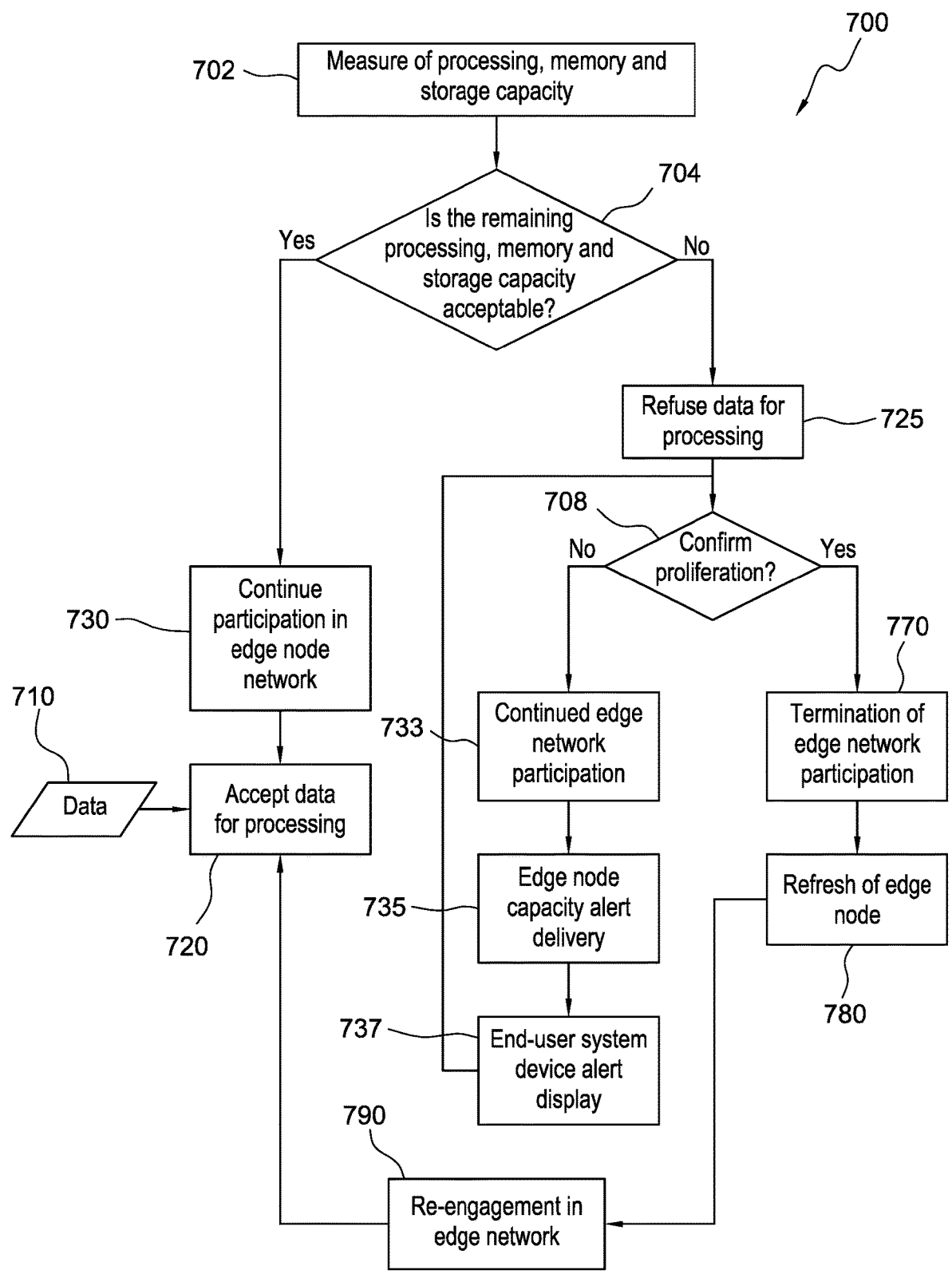
FIG. 7 illustrates a flow chart for the process of managing data storage, memory capacity and processing capacity of edge nodes in the production management system of the current embodiment.

FIG. 7 illustrates a flow chart for the process of managing data storage, memory capacity and processing capacity of edge nodes 700 in the production management system of the current embodiment.

The process 700 begins at step 702 which measures edge node processing, memory, and storage capacity.

The process 700 then proceeds to step 704 to determine whether the remaining processing, memory, and storage capacity 704 is acceptable. If yes, the process 700 proceeds to step 730 where the edge node continues participation in the edge node network 730 and then the process 700 proceeds to step 720 where the edge node accepts data for processing.

If not, the process 700 proceeds to step 725 where the edge node software refuses data from step 710.

The process 700 then proceeds to step 708 to confirm proliferation, which confirms proliferation of its records to the edge blockchain and the enterprise blockchain or public blockchain (i.e., core blockchain) to support trust and integrity, as well as its own edge node software to confirm delivery of any additional records to enterprise information systems and actions, or requests for actions, to production equipment, enterprise information systems, and any end user systems.

If no, the process 700 proceeds to step 733 where the edge node continues participation in the edge network and then the process 700 proceeds to step 735 where an edge node capacity alert delivery is sent to the end-user system device and then the process 700 proceeds to step 737 where a device alert is displayed until confirmation at step 740 can occur. The process 700 then returns to step 708.

If yes, the process 700 proceeds to step 770 which terminates participation in the edge network and the process 700 then proceeds to step 780 where the edge node refreshes by elimination of stored blockchain records.

The process 700 then proceeds to step 790 where the edge node software instructs the edge node to re-engage in the edge network and the process 700 then proceeds to step 720 to accept data for processing with instructions.

Figure 8:
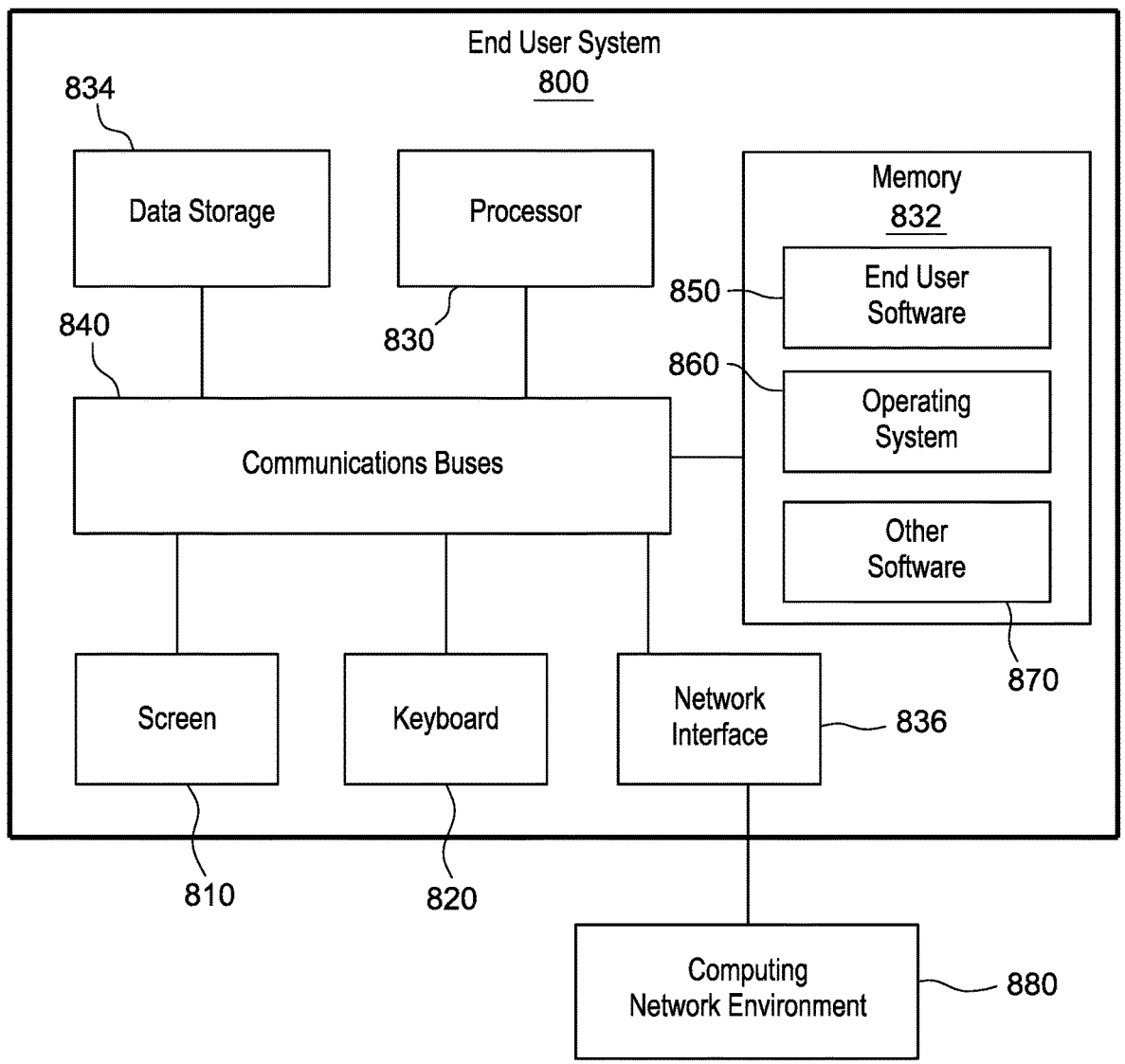
FIG. 8 illustrates a block diagram of an end user system for use in the production management system.

FIG. 8 illustrates a block diagram of an end user system 800 for use in the production management system.

Each end-user system 800 illustrated includes a screen 810, a keyboard 820, which may be external or available on the screen 810, a processor or microprocessor 830, memory 832, data storage 834, and a network interface 836. Communication between the processor 830, memory 832, storage 834, and the network interface 836 is accomplished by way of one or more communication buses 840. The network interface 836 would support connectivity to a computing network environment 880.

The end-user systems 800 for use in the intelligent, trusted production management system 100 includes memory 832 storing end-user software 850 for the intelligent, trusted production management system, and may have stored thereon various other software applications 870, including an operating system 860.

The end-user systems 800 may have fewer components or more components than shown in FIG. 8. Moreover, the storage device 834 may also not be necessary for operation of the end-user system 800 as data may be stored in memory, for example. Data may also be stored remotely and accessed over a network.

The memory 832 may, for example, include random access memory (RAM), dynamic RAM, or read only memory (ROM) (e.g., programmable ROM, erasable programmable ROM, or electronically erasable programmable ROM) and may store computer program instructions and information.

The processor 830 may be any desired processor or microprocessor, including a processor in a mobile device, tablet, laptop, or a personal computer. The processor 830 may, for example, be an Intel® type processor or another processor manufactured by, for example AMD®, DEC®, or Oracle®.

The processor 830 may furthermore execute the program instructions and process the data stored in the memory 832. In one embodiment, the instructions are stored in memory 832 in a compressed or encrypted format.

The storage device 834 may, for example, be non-volatile battery backed SRAM, a magnetic disk (e.g., hard drive), optical disk (e.g., CD-ROM) or any other device or signal that can store digital information. The network interface 836 permits communication between the end-user systems 800 and other components of the intelligent, trusted production management system 100.

End-user software 850 for the production management system may be installed on the end-user systems 800 to support display, via the screen 810, of data, events, actions, or requests for action to be taken from the user of the end-user systems 800 from the intelligent, trusted production management system 100.

The screen 810 may support user responses to requests for actions to be taken from the user of the end-user systems 800 via the screen 810 or the keyboard 820.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An edge node in a system for automated production management, the system comprising:
   a storage device configured to store data and program instructions; and
   a processor configured to:
      receive data from a production asset and process the data;
      detect an event from the data;
      add a record including the event to an edge blockchain;
      determine whether an action is required based on the event;
      communicate the action to the production asset
      add a record including the action to the edge blockchain;
      transmit edge blockchain to an enterprise information system to be stored in a core blockchain;
      measure the edge node memory and storage capacity;
      determine whether an acceptable amount of remaining memory and storage capacity exists in the edge node; and
      continue participation in edge blockchain.

2. The edge node in the system for automated production management of claim 1, wherein the processor is further configured to:
   queue the data for deletion and delete the data when an event from the data is not detected; and
   queue the event for deletion and delete the event when an action based on the event is not required.

3. The edge node in the system for automated production management of claim 1, wherein the processor is further configured to:
   detect an event from the data by:
      identifying a source of the data;
      matching the source of the data to be from an accepted source and matching the data to standard parameters for the data; and determining that the data is outside the range of the standard parameters.

4. The edge node in the system for automated production management of claim 1, wherein the processor is further configured to:
  determine whether an unacceptable amount of remaining memory and storage capacity exists in the edge node;
  confirm edge blockchain record proliferation has occurred;
  terminate participation in the edge blockchain;
  refresh the edge node;
  re-engage the edge node in the edge blockchain; and
  continue participation in the edge blockchain.

5. The system for automated production management of claim 4, wherein the processor is further configured to:
  confirm blockchain record proliferation has not occurred;
  continue participation in the edge blockchain; and
  send an edge node capacity alert to the end-user system device.

6. The edge node in the system for automated production management of claim 5, wherein the processor is further configured to:
  refuse the data for processing when an unacceptable amount of remaining memory and storage capacity exists in the edge node.

7. The edge node in the system for automated production management of claim 1, wherein the processor is further configured to:
  confirm the data, record the data to the storage device and validate the data.

8. The edge node in the system for automated production management of claim 1, wherein the production asset is a sensor, production equipment or enterprise information system.

9. An edge node, the edge node being configured to perform steps comprising:
  receiving data from a production asset and process the data;
  detecting an event from the data;
  adding a record to the edge blockchain;
  determining whether an action is required based on the event;
  communicating the action to the production asset;
  adding a record to the edge blockchain;
  transmitting edge blockchain to an enterprise information system to be stored in a core blockchain;
  measuring the edge node memory and storage capacity;
  determining whether an acceptable amount of remaining memory and storage capacity exists in the edge node; and
  continuing participation in edge blockchain.

10. The edge node of claim 9, the edge node configured to perform steps further comprising:
  queuing the data for deletion and delete the data when an event from the data is not detected; and
  queuing the event for deletion and delete the event when an action based on the event is not required.

11. The edge node of claim 9, the edge node configured to perform steps further comprising:
  detecting an event from the data based on an instruction set by:
    identifying a source of the data;
    matching the source of the data to be from an accepted source and matching the data to standard parameters for the data; and
    determining that the data is outside the range of the standard parameters.

12. The edge node of claim 9, the edge node configured to perform steps further comprising:
  determining whether an unacceptable amount of remaining memory and storage capacity exists in the edge node;
  confirming edge blockchain record proliferation has occurred;
  terminating participation in the edge blockchain;
  refreshing the edge node;
  re-engaging the edge node in the edge blockchain; and
  continuing participation in the edge blockchain.

13. The edge node of claim 12, the edge node configured for performing the steps further comprising:
  confirming blockchain record proliferation has not occurred;
  continuing participation in the edge blockchain; and
  sending an edge node capacity alert to the end-user system device.

14. The edge node of claim 13, the edge node configured for performing the steps further comprising:
  refusing the data for processing when an unacceptable amount of remaining memory and storage capacity exists in the edge node.

15. The edge node of claim 9, the edge node configured for performing the steps further comprising:
  adding the record to the edge blockchain confirming the record, recording the record to the storage device and validating the record.

16. The edge node of claim 9, wherein the production asset is a sensor, production equipment or enterprise information system.

* * * * *